Feb. 18, 1947.  G. A. DOLAN  2,416,047
COMBINED REACTOR AND INDUCTION PREHEATER
FOR USE IN ELECTRODE ARC WELDING
Filed July 10, 1943
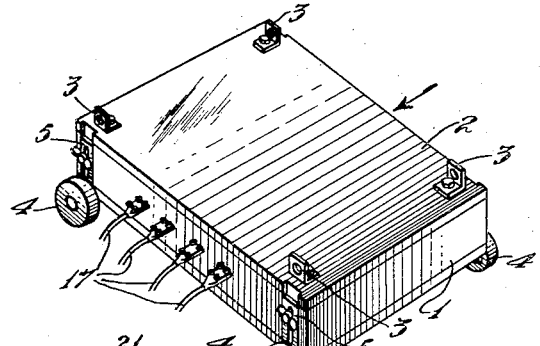
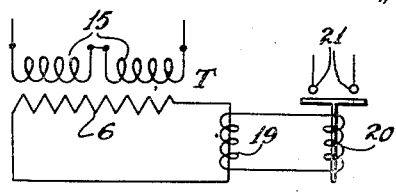
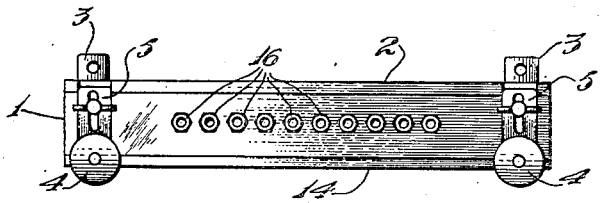
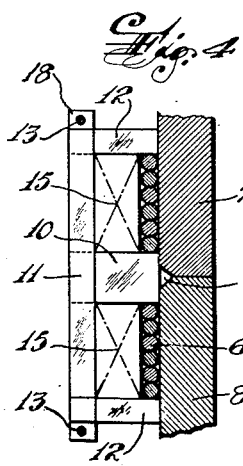
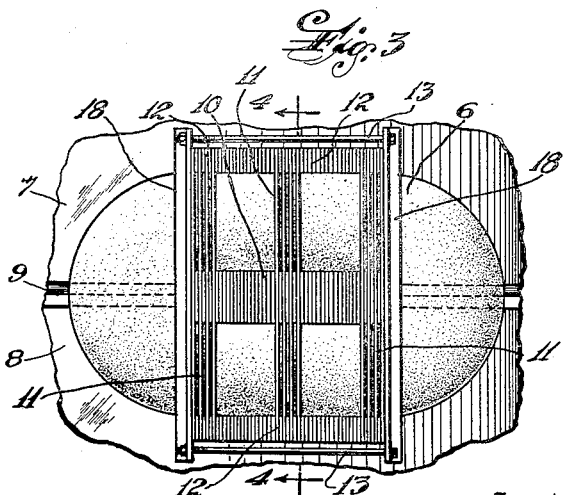
Inventor
George A. Dolan
By
A. D. T. Libby
Attorney Patented Feb. 18, 1947

2,416,047

UNITED STATES PATENT OFFICE 2,416,047

COMBINED REACTOR AND INDUCTION PRE-HEATER FOR USE IN ELECTRODE ARC WELDING

George A. Dolan, Hasbrouck Heights, N. J.

Application July 10, 1943, Serial No. 494,129

4 Claims. (Cl. 219—13)

This invention relates to an improved form of pre- and post-heater and reactor especially adapted for use in connection with arc-welding systems, both manual and continuous, wherein flux-coated electrodes are used in manual welding, or flux-coated or bare electrodes in connection with a thick blanket of flux.

In systems of welding wherein relatively large electrodes and currents are used, strains or stresses are many times set up in the metal in and around the weld. Especially is this true where large electrodes and currents are used in single-pass welding; that is, wherein the weld is made with a single passage of the electrode. In this last-mentioned welding system, as well as in some others, reactors are used in the arc circuit for steadying and regulating the welding current and the arc. The energy that is consumed in the reactor is, of course, wasted.

It is therefore the principal object of my invention to provide an apparatus which may be used not only as a pre-heater and post-heater or normalizer for removing the strains from the weld metal or weld area, but also as a reactor for use in the arc circuit. In some cases, the apparatus may be used simultaneously both as a reactor and heater.

Another object of my invention is to provide an apparatus for the purposes just described which may be advantageously handled and operated during the welding operations. This is especially true of the form to be described, wherein a primary winding is increased in the structure. This means that a very much smaller wire need be run to the structure from the source of energy, thereby removing the heavy drag which would be imposed on the apparatus if a large cable were used, which would be necessary, to carry the current required by the heavy wire secondary.

In the drawing:

Figure 1 illustrates a perspective view of a preferred form of the apparatus.

Figure 2 is a view looking in the direction of the arrow of Figure 1.

Figure 3 shows diagrammatically one form of the internal construction, the casing being entirely removed.

Figure 4 is a view on the line 4—4 of Figure 3.

Figure 5 is a diagram showing a protective circuit.

In the views, 1 is a casing of suitable insulating material, such as Transite, which is capable of standing a large amount of heat without detriment. The casing 1 is provided with a cover 2 and to the cover are fastened a plurality of lugs 3 for receiving grab-hooks for lifting the structure into position. The casing is preferably provided with a plurality of rollers 4 which are adjustably mounted by the members 5 whereby the casing 1 may be placed at different distances from the work or material to be welded.

Carried within the casing in any satisfactory manner, but shown outside of the casing in Figure 3, is a coil 6 positioned over two flat plates 7 and 8 having a seam 9 which is to be preheated, welded and normalized if necessary. The coil 6 is made up of a few turns of relatively large wire, varying according to the requirements. For many classes of work, I have found six turns of 500,000 circular mil cable to give very satisfactory results, especially when used with core members such as illustrated in Figures 3 and 4.

These core members may take various forms, but I have secured excellent results by using a centrally located core member 10 positioned within the opening of the coil 6. Passing transversely across the top of the coil 6 is a plurality of core member bars 11, three being shown merely for the purpose of illustration, and extending downwardly from the opposite ends of the bars 11 are portions 12 which extend between the ends of the bars as shown, even when the full longitudinal space is not taken up by the bars 11. All of these core members are preferably made of laminated steel such as used in electrical transformers. The laminations are held together in any satisfactory manner as by angle irons 18 and bolts 13.

When the apparatus is in position, as shown in Figure 3, it will be seen that the members 7 and 8 which are to be welded together complete the magnetic circuit, and the current flowing in the coil 6, which may be supplied from a suitable low-voltage secondary transformer, will cause the plates 7 and 8 to heat up rapidly. The closer the coil 6 is to the members 7 and 8, the better; but to protect the heating coil from weather effects, I may use a thin Transite plate 14 across the bottom just below the coil. If it is found desirable, the plate 14 may be removed and the coil 6 moved into direct contact with the metal pieces to be welded together.

Instead of using just the coil 6 alone, connected to a separate power transformer, I have found it more efficient and less expensive to utilize a primary winding, illustrated by the broken lines 15 in Figure 4; and when so used, the primary may be divided, for example, into two portions which may be connected in series for connection to 440 volts, or in parallel for a 220-volt supply, each section having taps brought out therefrom. These connectors are illustrated by 16 in Figure 2; likewise, the coil 6 may be connected in one or more parts as illustrated by the connections 17, whereby the sections may be connected either in series or parallel. These connections may be advantageous when the turns are greater in number than 6.

While I have not shown any means for moving of raising the coil 6 or the core members 10, 11 and 12 relative to the coil 6, means may be provided for this whereby the reactance of the structure may be varied, as well as by the adjustment of the rollers 4.

Because of the taps which may be brought out from the secondary of the transformer, or because of the adjustability of the secondary with respect to the metal to be welded, or its relation to the primary where a primary is used, the structure is adaptable for use as a pre- and post-heater device or, singly or simultaneously, as a reactor in the arc circuit.

In Figure 5 I have illustrated, diagrammatically, means for protecting the structure as well as the source of supply. In this figure, the secondary winding 6 is short-circuited, as is the case when used with a primary as indicated in Figure 4, and a current transformer 19 surrounds one of the lead wires. The current transformer is connected to a protective coil which, when sufficiently excited, serves to operate a tripping circuit. This may be brought about when the current in the winding 6 has reached a predetermined high value that may be brought about if the structure is removed from the workpiece before opening the primary circuit.

Such an act will set up a high current in the current transformer 19 that in turn energizes the winding 20 of the protective coil and this closes the contacts 21 which, in turn, will interrupt the supply line apparatus.

It will be obvious that certain of the mechanical details may be varied without departing from the spirit of my invention or the scope of the appended claims; for example, instead of the structure being flat as shown in Figure 1, it may be curved to fit the surface to be operated on.

What I claim is:

1. A combined reactor and induction heater for use in electrode arc welding including a casing having rollers adjustably mounted on the casing for adjusting the position of the casing in a vertical direction and for movably supporting the casing longitudinally on the metal to be heat-treated, a core of magnetic material within the casing, two windings associated in inductive relation with the core, one winding being the primary of a transformer, while the other is a closed circuit secondary and is of large current-carrying capacity and positioned in the casing so it and magnetic completing parts of the core may be brought by adjustment of said rollers into contact with the metal to be heat-treated.

2. For use in electrode arc welding, a low-frequency heating coil structure for application directly to the metal to be welded, the coil structure including a fire-proof open-sided casing of insulating material having means for quickly lifting the casing into operative position, further means for moving the casing along the weld area, and a single layer of few turns of a conductor of large current-carrying capacity mounted within the casing so the outer peripheral parts of the said turns of the conductor are in substantially the plane of the open side, and a removable protecting plate for the open side of the casing.

3. A preheater and reactor for the purposes described, comprising a transformer having a normally open magnetic circuit but which is completed through the metal to be heated, the transformer having a primary winding for connection to a source of low frequency power and a short-circuited secondary positioned away from the primary for close application to the metal to be heated.

4. A preheater and reactor as set forth in claim 3, further defined in that means are provided for completely and instantaneously removing the source of power from the transformer should for any reason its reactance become too low.

GEORGE A. DOLAN.

REFERENCES CITED

The following references are of record in the file of this patent:

UNITED STATES PATENTS

| Number | Name | Date |
|---|---|---|
| 2,024,906 | Bennett | Dec. 17, 1935 |
| 1,915,047 | Blakeslee | June 20, 1933 |
| 1,809,468 | Bornand et al. | June 9, 1931 |
| 1,709,716 | Fielder | Apr. 16, 1929 |
| 1,383,963 | Mordey | July 5, 1921 |
| 1,378,187 | Northrup | May 17, 1921 |
| 2,281,170 | Payne | Apr. 28, 1942 |
| 2,184,534 | Smith et al. | Dec. 26, 1939 |
| 1,932,423 | Sessions | Oct. 31, 1933 |

Certificate of Correction

Patent No. 2,416,047. February 18, 1947.

GEORGE A. DOLAN

It is hereby certified that errors appear in the printed specification of the above numbered patent requiring correction as follows: Column 1, line 33, for "increased" read *incorporated*; column 3, line 12, for "of raising" read *or raising*; and that the said Letters Patent should be read with these corrections therein that the same may conform to the record of the case in the Patent Office.

Signed and sealed this 15th day of April, A. D. 1947.

[SEAL]

LESLIE FRAZER,
*First Assistant Commissioner of Patents.*